Aug. 13, 1968     T. P. RADE     3,396,421
ADJUSTABLE SCRAPER IMPLEMENT
Filed May 5, 1967
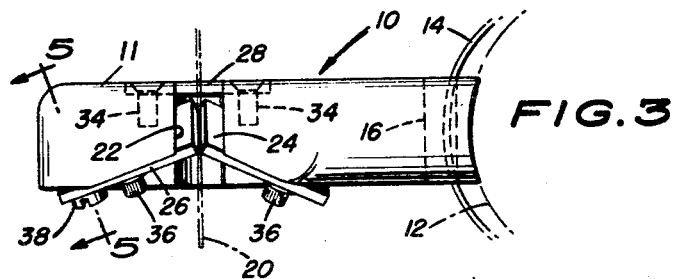
FIG. 3
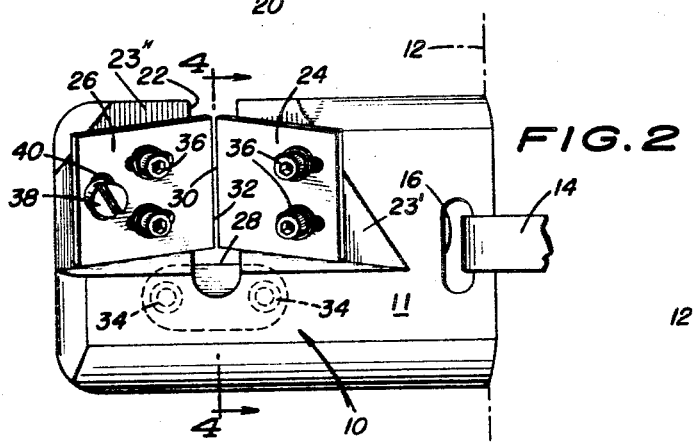
FIG. 2
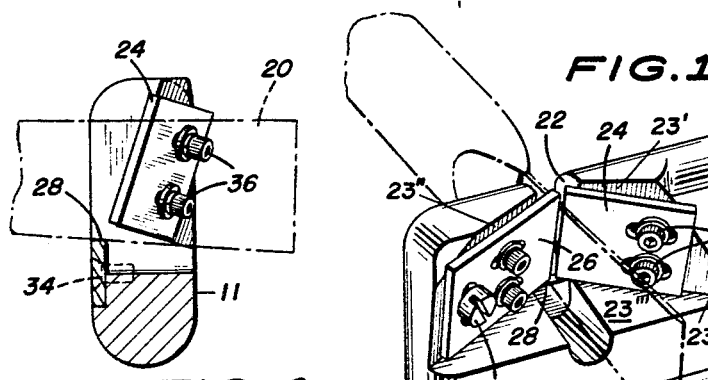
FIG. 1
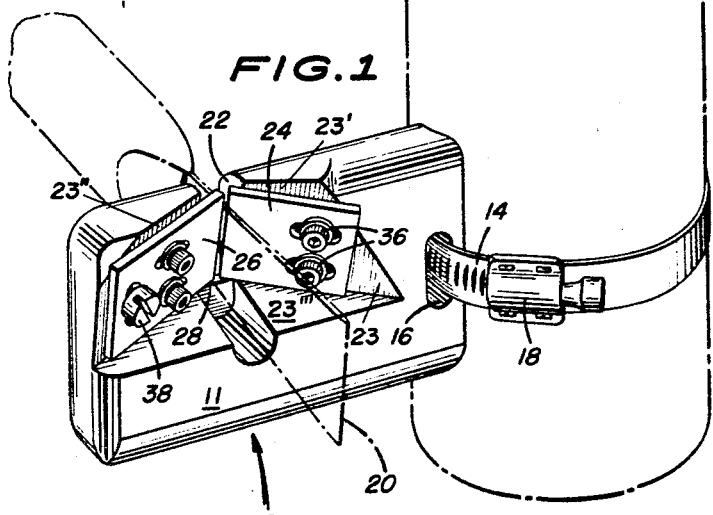
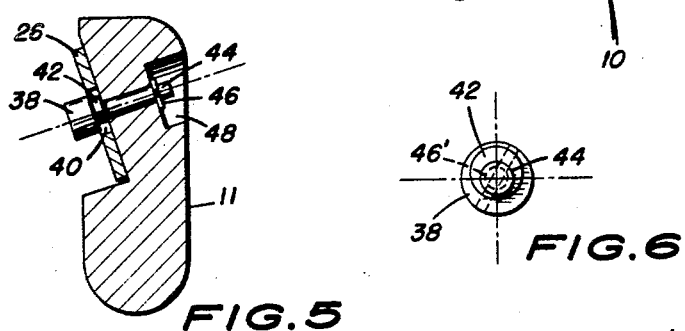
FIG. 4
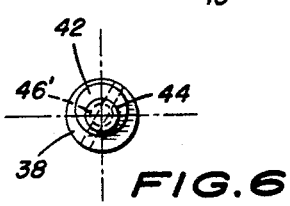
FIG. 6
FIG. 5
THEODORE P. RADE
INVENTOR
BY Walter G. Finch
ATTORNEY United States Patent Office 3,396,421
Patented Aug. 13, 1968

3,396,421
ADJUSTABLE SCRAPER IMPLEMENT
Theodore P. Rade, 3112 N. Rolling Road,
Baltimore, Md. 21207
Filed May 5, 1967, Ser. No. 636,295
4 Claims. (Cl. 15—236)

ABSTRACT OF THE DISCLOSURE

A scraper tool is disclosed for cleaning the blade of a putty knife of adherent burnt paint. Squared, hardened-edge blades are mounted in mutually sloping relationship. The assembly is arranged for strapping to a bottle torch which allows for two-handed action when the blade of the putty knife is drawn through the gap between the blades. An eccentric screw adjustment for setting the blades is provided.

This invention relates generally to tools, and more particularly it pertains to an adjustable scraper implement for use with putty knives.

Accordingly, it is an object of this invention to provide a torch-mounted putty knife cleaner which is always readily available and is so positioned for most effective cleaning action.

Another object of this invention is to provide a scraper of this character which operates with a simultaneous shearing action on both sides and an edge of the putty knife.

Still another object of this invention is to provide a fine adjusting screw arrangement for positioning the blades relative to one another.

Other objects and attendant advantages of this invention will become more readily apparent and understood from the following detailed specification and single sheet of accompanying drawings in which:

FIG. 1 is a perspective view of an adjustable scraper implement or knife cleaner with the putty knife and torch shown in phantom lines;

FIGS. 2 and 3 are side and top views, respectively, depicting relationship of the cleaning blades;

FIG. 4 is a cross section taken on line 4—4 of FIG. 2 and viewed in the direction of the arrows;

FIG. 5 is a cross section taken on line 5—5 of FIG. 3; and

FIG. 6 is a detail end view of a fine adjustment screw.

In FIGS. 1, 2, and 3 of the drawings, reference numeral 10 indicates generally an adjustable scraper implement or putty knife scraper embodying features of this invention.

This scraper 10 is formed from a rectangular block 11 of metal or plastic which is contoured on one side to fit snugly against the side of a bottle-type torch 12 as shown in FIGS. 1, 2, and 3. A strap 14 around the torch engages a slot 16 at this end of the scraper 10 and binds the two securely together when a clamp screw 18 is tightened.

A trihedral recess 23 is machined in one side of the block 11 forming three walls 23', 23" and 23''' which slope mutually toward each other like two sides and the base of a pyramid. A slot 22 is cut downwardly through the block 11 on the medial line of recess 23 thus dividing the walls 23' and 23".

A square edged hardened blade 28 is mounted on screws 34 to bridge the slot 22 near its lower end and is preferably recessed into the block 11 as best shown in FIGS. 3 and 4.

A pair of blades 24 and 26 are mounted with screws 36 on respective walls 23' and 23" so their opposing square and hardened edges 30 and 32 are spaced the blade thickness of a putty knife 20.

The screws 36 pass through horizontally elongated holes and one blade 26 further has a vertical slot 40 in which a fine adjustment screw 38 operates for this purpose as best shown in FIG. 5.

This adjustment screw 38 is provided with an eccentric shoulder 42 turned in its head of such width as to fit closely within the slot 40.

As shown in FIG. 6, the shank 44 of this screw passes through the block 11 into a counterbore 48 and is here retained by a C-washer 46 crimped into a groove 46' near the end of the shank.

The operator holds the torch 12 in his left hand with the attached invention 10 extending toward his right. So positioned, it is very simple to draw the putty knife 20 through the blades 24 and 26 with his right hand opposing the frictional drag with a thrust on the torch bottle with his left hand.

The unique angular relationship of the blades provides an angular shear action which is very effective against adherent paint or putty or similar materials.

Obviously many modifications and variations of the present invention are possible in light of the above teachings. It is, therefore, to be understood that within the scope of the appended claims the invention may be practiced otherwise than as specifically described.

What is claimed is:

1. An adjustable scraper implement, comprising, a rectangular block, said block having a trihedral recess provided in one side thereof forming two side walls and a base wall sloping mutually toward each other, said block having a slot provided downwardly therethrough on the medial line of said recess dividing said two side walls, first blade means mounted to bridge said slot near its lower end, and second and third blade means mounted on said two side walls and arranged so that their opposing edges are spaced from each other and in alignment with said slot, and means for adjusting one of said second and third blade means with respect to each other.

2. An adjustable scraper implement as recited in claim 1, wherein said first, second, and third blade means are formed with square, hardened-edge blades.

3. An adjustable scraper implement as recited in claim 1, wherein one blade means of said second and third blade means is provided with an eccentric screw adjustment for setting said one blade means.

4. An adjustable scraper implement as recited in claim 1, and additionally means for securing said block to a bottle torch.

References Cited

UNITED STATES PATENTS

| | | | |
|---|---|---|---|
| 2,707,299 | 5/1955 | Steindorf et al. | 15—236 |
| 2,839,772 | 6/1958 | Lambert | 15—236 |
| 2,861,288 | 11/1958 | Steindorf | 15—236 |
| 3,101,503 | 8/1963 | Wiechmann | 15—236 |

FOREIGN PATENTS 84,319   3/1920   Switzerland.

CHARLES A. WILLMUTH, *Primary Examiner.*
L. MACHLIN, *Assistant Examiner.*